United States Patent
Serizawa et al.

(10) Patent No.: US 6,245,997 B1
(45) Date of Patent: Jun. 12, 2001

(54) ARRANGEMENT STRUCTURE OF DOOR HARNESS FOR VEHICLE

(75) Inventors: Yasuyoshi Serizawa; Kentaro Shiraki, both of Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/268,337

(22) Filed: Mar. 16, 1999

(30) Foreign Application Priority Data

Mar. 18, 1998 (JP) .................................................. 10-068675

(51) Int. Cl.[7] ............................................................ H01B 3/00
(52) U.S. Cl. ........................ 174/72 A; 174/71 R; 174/72 R
(58) Field of Search ............................ 174/71 R, 72 A, 174/72 R

(56) References Cited

U.S. PATENT DOCUMENTS

| | | | | |
|---|---|---|---|---|
| 4,907,836 | * | 3/1990 | Ueda et al. ........................... | 276/39.1 |
| 5,092,647 | * | 3/1992 | Ueda et al. ........................... | 296/146 |
| 5,584,144 | * | 12/1996 | Hisano .................................. | 49/502 |
| 5,879,047 | * | 3/1999 | Yamaguchi et al. ................. | 296/146.7 |
| 5,884,961 | * | 3/1999 | Serizawa et al. .................... | 296/146.7 |
| 5,897,157 | * | 4/1999 | Yamaguchi et al. ................. | 296/146.7 |
| 5,921,782 | * | 7/1999 | Yamaguchi et al. ................. | 439/34 |
| 6,070,931 | * | 6/2000 | Yamaguchi et al. ................. | 296/146.7 |
| 6,092,859 | * | 7/2000 | Serizawa et al. .................... | 296/146.7 |

FOREIGN PATENT DOCUMENTS

| | | | | |
|---|---|---|---|---|
| 0123456 A2 | * | 1/2000 | (EP) ..................................... | 100/100 |
| 10-217874 | | 8/1998 | (JP) . | |

* cited by examiner

Primary Examiner—Dean A. Reichard
Assistant Examiner—Charlie Nguyen
(74) Attorney, Agent, or Firm—Armstrong, Westerman, Hattori, McLeland & Naughton, LLP

(57) ABSTRACT

An arrangement structure for a door harness for a vehicle includes a wire harness which can be curved to form a loop segment; a harness protector in which the wire harness is held; a guide section in which the harness protector is slidably engaged; a harness accommodating section in which the loop segment of the wire harness is accommodated; and a door structure integrated to the guide section and the harness accommodating section. This configuration improves the productivity of a vehicle and reduces the cost of components.

10 Claims, 4 Drawing Sheets

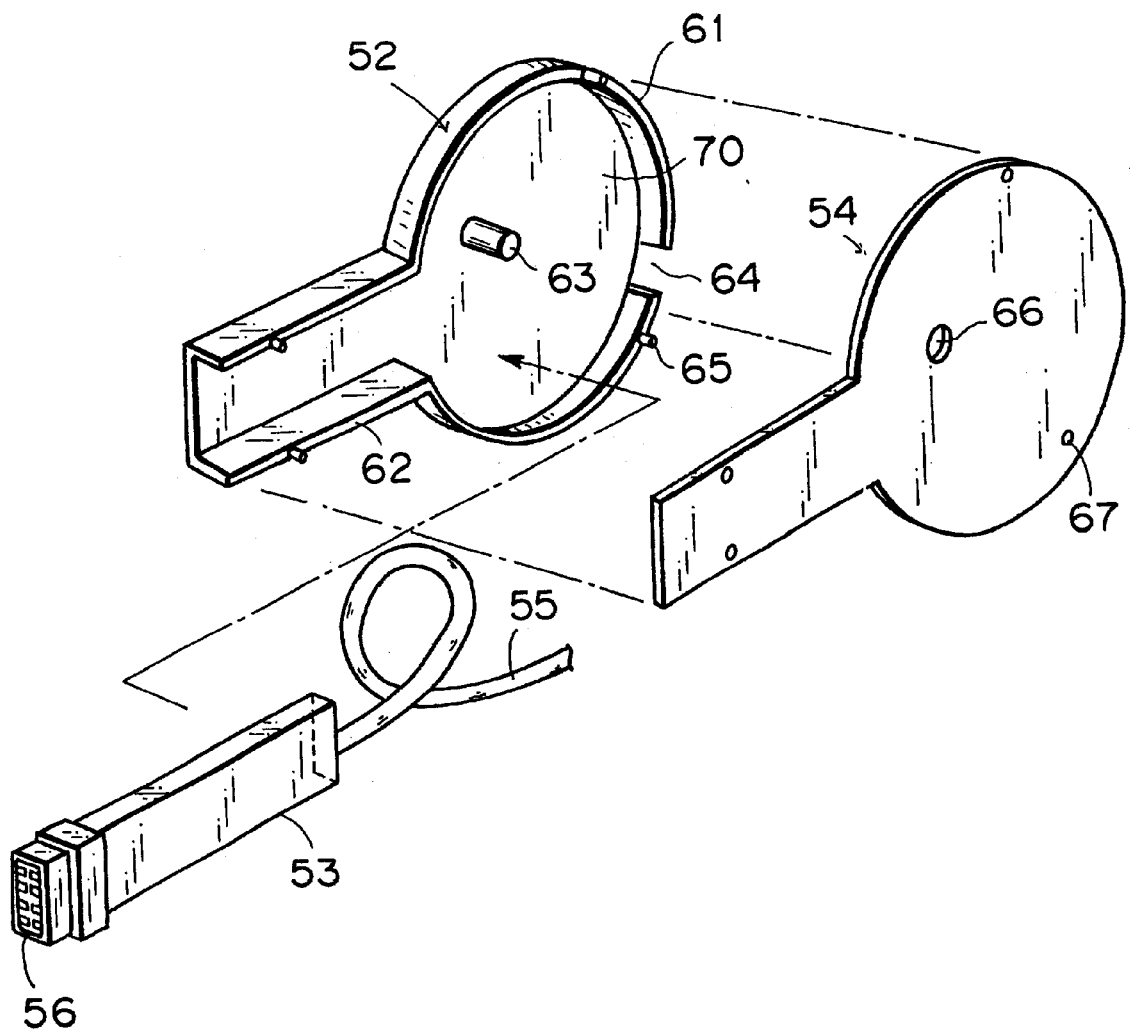

ARRANGEMENT STRUCTURE OF DOOR HARNESS FOR VEHICLE

BACKGROUND OF THE INVENTION

1. Field of the Invention

The present invention relates to an arrangement structure of a door harness for a vehicle in which a looping portion is expanded or contracted when a vehicle door is opened or closed.

2. Related Art

FIGS. 6–7 show an arrangement structure of a vehicle door which was proposed JP-A-10-217874 laid open Aug. 18, 1998.

This structure includes a harness accommodating structure of synthetic resin assembled with a door inner panel 51 of a motor vehicle, a harness protector 53 which is slidably fit in the harness accommodating case 52 and a cover 54 overlaid on the harness accommodating case 52.

A wire harness (door harness) 55 is passed through the harness protector 53. The one end of the wire harness 55 is communicated with a connector 56 at the tip of the harness protector 53 (FIG. 7). The other end of the wire harness 55 is connected to each of auxiliary machines such as a power window motor or door lock (not shown) within the door and a switch unit of the side of a door trim 68. The connector 56 (FIG. 7) is connected to a connector 60 of a wire harness 59 at a rotatable bracket 58 on the side of vehicle body 57.

As shown in FIG. 7, the harness accommodating case 52 includes a circle portion 61 in which the wire harness 55 is housed in a ring shape and a rectangular portion 62 in which the harness protector 53 is slidably fit. The wire harness 55 is expandable within the circular portion 61 when the door is opened or closed. When the door is opened as shown in FIG. 6, the wire harness 55 is pulled to expand, whereas when the door is closed, the wire harness 55 is expanded to make a loop within the circular portion 61 to absorb the slack thus generated.

The harness accommodating case 52 is provided with a harness supporting pin 63, a harness drawing opening 64 and a pin 65 used to fix a cover 54. The cover 54 is provided with engagement holes 66 and 67 which are to be engaged with the pins 63 and 65, respectively. The wire harness 55 is arranged to surround the harness supporting pin 63 in a loop.

However, the above conventional structure has the following disadvantages. Specifically, this structure is accompanied with troublesome operations of assembling the harness accommodating case 52 with the door inner panel 51 and assembling the cover 54 with the harness accommodating case 52. This structure requires much cost to fabricate components such as the harness accommodating case 52 and cover 54. In addition, when the wire harness 55 expands or shrinks within the harness accommodating case 52 in door opening or closing, it may be rubbed against the bottom plate 70 of the harness accommodating case 52 to generate foreign sound and may be difficult to expand or contract smoothly.

SUMMARY OF THE INVENTION

An object of the present invention is to provide an arrangement structure of a vehicle door which houses a wire harness in an expanding or contracting manner within a vehicle door and can reduce the man-hours and cost required to assemble the components such as a harness accommodating case and can expand or shrink a wire harness with no foreign sound.

In order to attain the above object, in accordance with the present invention, there is provided an arrangement structure for a door harness for a vehicle comprising: a wire harness which can be curved to form a loop segment; a harness protector in which the wire harness is held; a guide section in which the harness protector is slidably engaged; a harness accommodating section in which the loop segment of the wire harness is accommodated; and a door structure integrated to said guide section and the harness accommodating section. In this configuration, since the guide section is integrally formed to the door structure, it is not necessary to assemble or form the guide section and the harness accommodating section individually, thereby improving the productivity of a vehicle and reducing the cost required to prepare the components.

Preferably, the guide section has a pair of guide components each having an L-shape in cross section, and the harness protector has a pair of plate-like sliding portions which is in slidable-contact with the guide components, respectively. In this configuration, the guide components having a simple L-shape in cross section can be easily formed integrally to the door structure. In addition, the plate-like sliding portion permits the harness protector to slide smoothly.

Preferably, the harness accommodating section has a harness accommodation wall which is successive to the guide section and is uprighted integrally from the door structure.

In this configuration, the harness accommodating wall can surely protect the loop segment of the wire harness.

Preferably, said harness accommodating section has a plurality of harness sliding protrusive strips radially formed to correspond to the loop segment of the wire harness.

In this configuration, when the door is opened or closed, the loop segment of the wire harness expands or contracts while it is in sliding-contact with the harness sliding protrusive strips with low friction, thereby preventing sliding sound from occurring and permitting the smooth expansion/contraction operation of the loop segment.

Preferably, the harness accommodating portion has a harness securing piece formed integrally to the door structure. This configuration reduces the man-hours of mounting the harness securing piece and component cost, and surely secure the wire harness to the door structure to prevent foreign sound from occurring.

Preferably, the harness securing piece has a harness securing arm to form a gap into which the harness is to be inserted. In this configuration, since the wire harness can be easily inserted into the harness securing piece from the gap, thereby simplifying the harness securing operation.

The wire harness includes a straight segment on which a tape is wound and said loop segment, the loop segment is composed of a fixed portion on which the tape is wound and secured to the harness securing piece and an expandable/contractable portion successive to the harness protector. In this confguration, since the portion of the wire harness on which the tape is wound can be smoothly and easily inserted into the harness securing arm of the harness securing piece. In addition, since the expandable/contractable portion of the loop segment on which the tape is not wound is curved flexibly, the expansion/contraction operation can be carried out smoothly and surely.

Preferably, the harness accommodating portion has a harness supporting pin is formed integrally to the door structure so that it is located inside the loop segment. In this configuration, since the shape of the loop segment when the loop segment is contracted is assured by the harness supporting pin integrated to the door structure, the subsequent expansion operation of the loop segment can be smoothly carried out.

Preferably, the harness accommodating section has a cover securing piece formed integrally to the door structure and to be engaged with a cover. In this configuration, the harness accommodating section can be surely closed by the cover.

The above and other objects and features of the present invention will be more apparent from the following description taken in conjunction with the accompanying drawings.

BRIEF DESCRIPTION OF THE DRAWINGS

FIG. 7 an exploded perspective view showing a main part of the conventional arrangement structure.

DESCRIPTION OF THE PREFERRED EMBODIMENTS

Figure 1:
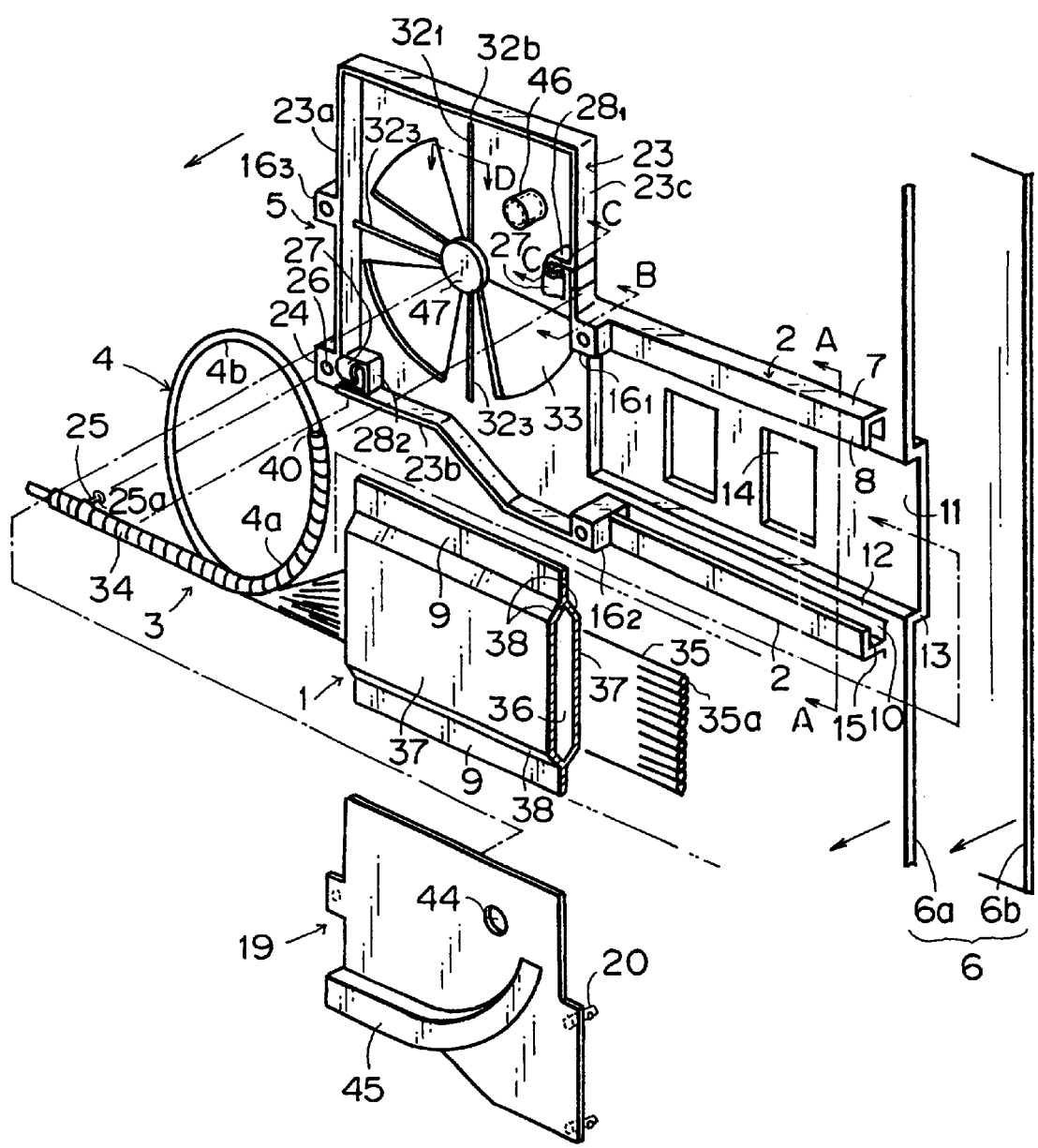
FIG. 1 is an exploded perspective view showing an embodiment of an arrangement structure of a door harness for a vehicle.

Now referring to the drawings, an explanation will be given of embodiments of the present invention.

FIG. 1 shows an embodiment of an arrangement structure of a door harness for a vehicle.

This structure is characterized in that a guide 2 used to slide a harness protector 1 and a harness accommodating section 5 for a loop segment 4 of a wire harness (door harness) are integrated to a door trim (door structure) 6 of synthetic resin.

The door trim 6 is composed of a trim core 6a and a trim cover 6b. The guide section 2 and harness accommodating section 5 are located on the outer surface of the trim core 6a, i.e. near a door inner panel (not shown). The trim cover 6b faces the indoor side. The guide section 2 is located near a door hinge (not shown). The door trim in FIG. 1 is shown as a front left handle for inconvenience of illustration.

Figure 2:
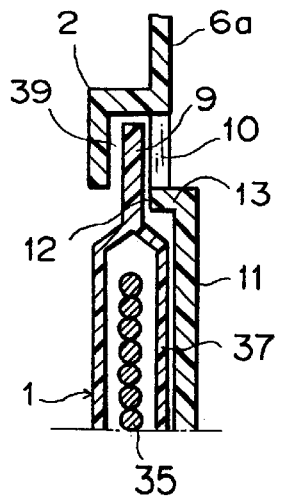
FIG. 2 is a sectional view taken in line A—A showing the arrangement state between a harness protector and a guide.

The guide section 2 is a pair of upper and lower guide components (simply referred to as "guides") which are symmetrical. Each guide 2, as shown in FIG. 2 (taken in line A—A in FIG. 1), is composed of a horizontal wall 7 extending from the trim core 6a and a vertical wall 8 inwardly protruding from the horizontal wall 7, these walls 7 and 8 being formed in a L-shape in a longitudinal cross section. The trim core 6a has a through-hole 10 which is opposite to each vertical wall 8. The through-hole 10 serves to draw a shape and also reduce the sliding sound (i.e. sliding area) between the harness protector 1 and sliding portion 9.

In FIG. 1, between the pair of guides 2 and 2, the trim core 6a is swelled toward the trim cover 6b to form a concave portion 11 for receiving the harness protector 1. Between the concave portion 11 and through-hole 10, a sliding-contact portion 12 having a small width is formed to communicate with the harness protector 1. As seen from FIG. 2, the sliding-contact portion 12 has a width equal to that of each of the upper and lower side walls 13 of the concave portion 11. As seen from FIG. 1, the concave portion 11 has through-holes 14 which serve to recognize the harness protector 1, reduce the weight and to reduce the sound (i.e. area) due to the sliding between itself and the harness protector 1. The front ends 15 of the guides 2 are opened and the rear ends thereof are closed by cover fixing pieces $16_1$ and $16_2$, respectively.

Figure 3:
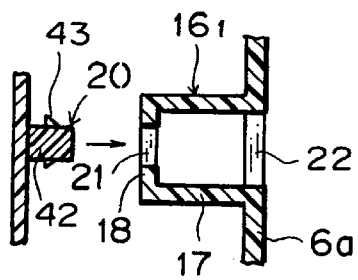
FIG. 3 is a sectional view taken in line B—B showing the state where a cover is to be secured to a cover-securing portion.

The cover fixing piece 161, 162 as seen from FIG. 3 (taken in line B—B in FIG. 1), has an engagement hole 21 formed in a tip wall 18 of a hollow square column 17 and corresponding to a locking pin 20 of a cover 19. The column 17 is extends from the panel core 6a. The trim core 6a has a through-hole 21 which is opposite to the engagement hole 21 and serves to draw a shape and unlock the cover 19. In FIG. 1, the concave portion 11 is slightly extended rearward from the cover fixing pieces 16, and 162(rearward in a vehicle running direction). The cover 19 can be replaced by a door inner panel of synthetic resin (not shown) (denoted by reference numeral 51 in FIG. 6 in the prior art).

Behind the concave portion 11, the harness accommodating wall 23, starting from the cover fixing pieces $16_1$ and $16_2$, is uprighted from the trim core 6a in a square frame shape. The harness accommodating wall 23 has a cover fixing piece 163 formed integrally to the center of its rear wall 23a. The uprighting height of the harness accommodating wall 23 is equal to that of the cover fixing pieces $16_1$–$16_3$.

The harness accommodating wall 23 has a harness fixing piece 24 formed on the lower side of the real wall 23a. The harness fixing piece 24 has an engagement hole 26 for a clamp 25 for clamping the wire harness 3 and has the same structure as the cover fixing pieces $16_1$–$16_3$. The harness accommodating wall 23 has harness fixing pieces $28_1$–$28_2$ each having an arc harness securing arm 27, which are formed integrally to the wall 23 near the rear end of the lower 23b and near the upper cover fixing piece $16_1$ on the front wall 23c.

Figure 4:
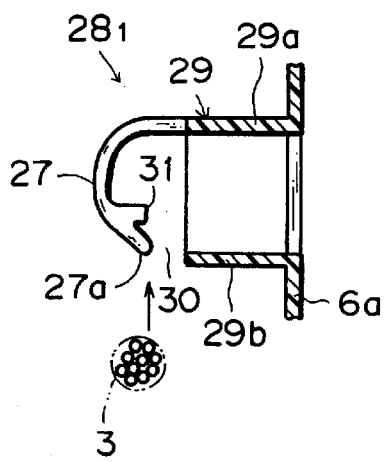
FIG. 4 is a sectional view taken in line C—C showing an example of the harness securing portion.

The harness fixing piece $28_1$ ($28_2$), as seen form FIG. 4 (taken in line C—C in FIG. 1), has the flexible harness securing arm 27 at the tip of the one side wall 29a of a square cylindrical column 29a. The harness securing arm Z7 is curved toward the other side wall 29b (harness accommodating wall 23) so as to form a harness insertion gap 30 between its tip 27a and the other side wall 29b. At the tip portion of the harness securing arm 27, a protrusion 31 dangles toward the trim core 6a inside the tip 27a to prevent the harness from coming off, i.e. to hold the harness.

In FIG. 1, two harness securing arms 27 are located to protrude from the harness accommodating wall 23 so that the arm tip 27a (FIG. 4), i.e. harness insertion gap 30 (FIG. 4) is located outside the harness accommodating wall 23. The wire harness 3 is inserted in each harness securing arm 27 from the outside of the harness accommodating wall 23. Since the harness insertion gap 30 is located outward, the loop 4 of the wire harness 3 is strongly pulled when its diameter is reduced, the wire harness 3 does not come off the harness securing arm 27. Incidentally, the harness fixing piece $28_1$, $28_2$ may be implemented in a clamping manner like the harness fixing piece 24.

On the surface of the trim core 6a surrounded by the harness accommodating wall 23, three protrusive strips $32_1$–$32_3$ for harness sliding are formed radially in a upward, downward and rearward direction around a center low boss 47. These strips are formed integrally to the trim core 6a. They are arranged at intervals of about 90°, and extended from the boss 47 to the vicinity of the harness accommodating wall 23. The protrusive strip $32_1$–$32_3$ are extended in a diameter direction of the loop segment 4 of the wire harness 3 so that they are orthogonally brought into contact with the loop 4.

Figure 5:
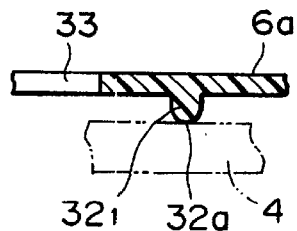
FIG. 5 is a sectional view taken in line D—D showing the sliding state between a protrusion strip for harness sliding and a wiring harness.

As seen from FIG. 5, the protrusive strip $32_1$,($32_2$,$32_3$) in formed in a semicircular shape in longitudinal cross section. The protrusive strip $32_1$,($32_2$, $32_3$) has a curved sliding face 32a at its tip which can be smoothly brought into contact with the loop segment 4 of the wire harness 3 (FIG. 1) with low friction through not face-contact but line-contact. When a vehicle door is opened or closed, the loop 4 of the wire harness 3 smoothly expands or contracts and does not generate foreign sound. In FIG. 1, the trim core 6a has fan-like through-holes 33 between the protrusive strips $32_1$–$32_3$ to avoid wasteful sliding contact and to reduce the weight.

On the surface of trim core 6a surrounded by the harness accommodating wall 23, a hollow harness supporting pin 46 is integrally protruded from the trim core 6a between the upper protrusive strip 321 and the front harness securing piece $28_1$. The height of the harness supporting pin 46 is approximately equal to that of the harness accommodating wall 23. The harness supporting pin 46 serves as a harness stopper and positioning member when the diameter of the loop 4 of the wire harness 3 is reduced. The harness supporting pin 46 assures the shape of the loop 4, when the diameter is reduced, in a small shape so that the operation of enlarging the loop diameter when the door is opened again can be smoothly and surely carried out.

The wire harness 3 is composed of a straight segment 34, which extends rearward to an auxiliary machine (not shown) in the door and has a circular section, the above loop segment 4, which has a circular section and bends upward to form a ring, and a flat segment 35 which has a flat section to extend forward from the loop segment 4. The flat segment 35 is composed of a plurality of electric wires 35a arranged in parallel vertically. The respective electric wires 35a are expanded from the end of the loop segment 4 to form a fan-like expanded portion 35b. The end of the loop segment 4 is preferably bundled by e.g. a band. The flat segment 35 serving as a flat wire harness is connector-communicated with a wire harness of a vehicle body.

Figure 6:
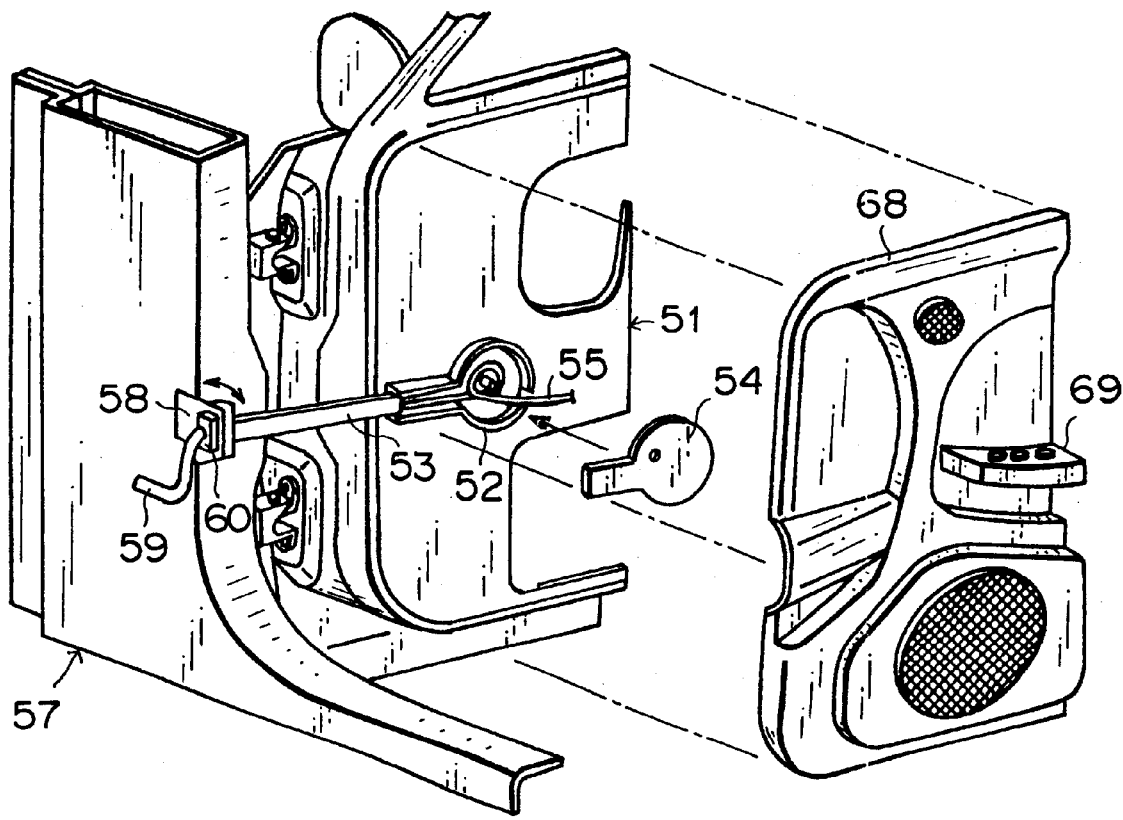
FIG. 6 is an exploded perspective view showing a conventional arrangement structure of a door harness for a vehicle.

A harness protector 1 is placed to surround the outside of the flat segment 35. The harness protector 1 is made of a soft material such as synthetic resin and rubber so that it can bend when the door 1 is opened or closed. The harness protector 1 is extended to a connector coupling portion on the side of the vehicle body. The harness protector 1 may be made of hard synthetic resin so as to correspond to the conventional rotatable-type connector 60 (FIG. 6).

The harness protector 1 is right and left side walls and two pairs of upper and left slanted walls 38, which constitute a longitudinal through-hole through which the flat segment 35 of the wire harness 3 is passed, and a pair of upper and lower plate4ike sliding portions 9 which vertically protrude from the tips of the slanted walls 38. The entire harness protector 1 is formed in a flat shape. The sliding portion 9, which has a larger thickness than that of the side wall 37, is slidably engaged in the groove 39 of the guide portion 39 of the trim core 6a as shown in FIG. 2.

As seen from FIG. 1, a tape 40 is wound over the straight segment 34 of the wire harness 3 to the halfway of the loop segment 4 (position corresponding to the front harness securing piece $28_1$) so that the shape of the straight segment 34 and the bending starting side 4a of the loop segment 4 are settled to a certain degree. The tape-wound wire harness portion, i.e. the bending starting side 4a of the loop segment 4 and straight segment 34 are inserted smoothly and easily into each of the harness securing arms 27 of the front and rear harness securing pieces $28_1$ and $28_2$ and secured there. The portion 4b of the loop segment 4 curves greatly from the harness securing piece $28_1$ along the harness supporting pin 46 while it is orthogonally in contact with the three harness sliding protrusive strips $32_1$–$32_3$ and communicates to the fan-like expanded portion 35b, is not tape-wound. This position 4b, which is not tape-wound, can expand or contract easily.

A clamp 25 is mounted at the straight portion 34 of the wire harness 3. The clamp 25 is fit in the harness securing piece 24 on the rear side. The clamp 25 may a known clamp provided with a flexible securing hear 25a corresponding to the engagement hole 26.

The harness protector 1 is inserted into the guide section 2 in such a manner that its sliding portions 9 are slid from the from opening 15 of the guide section 2. Thus, as shown in FIG. 2, its half inclusive of the one side wall 37 is accommodated in the concave portion 11 of the trim core 6a. The wire harness 3 is secured by the respective harness securing pieces 24, $28_1$ and $28_2$ in a state curved in a loop. The loop segment 4 of the wire harness is accommodated expandably and contractably in the harness accommodating wall 23. In this case, the loop segment 4 is located in contact with the three sliding protrusive strips $32_1$–$32_3$. A cover 19 or door inner panel (not shown) of synthetic resin serving a cover is overlaid on the harness accommodating portion 5.

The cover 19 is made of synthetic resin and formed in a square. The cover 19 has locking pins 20 formed integrally to its end portion and correspond to the cover securing pieces $16_1$–$16_3$ at the three points of the trim core 6a. Each locking pin 20 is composed of a shaft 42 and a pair of resilient securing pieces 43 attached thereto. The locking pin 20 is inserted into the engagement hole 21 of each of the cover securing pieces $16_1$–$16_3$ of the trim core 6a so that resilient securing pieces 43 can be secured to the edge of the engagement hole 21.

As seen from FIG. 1, the cover 18 has an engagement hole corresponding to the harness supporting pin 46 of the harness accommodating portion 5. The cover 18 has a harness accommodating concave portion 45 which is swelled externally and curved upwards so as to correspond to the tape wound portion of the wire harness 3, i.e. straight portion 34 and the bending starting side 4a of the loop segment 4.

The door inner panel (other door structure) of synthetic resin, which is to be used in place of the cover 19, has also the harness accommodating concave portion 45 and the engagement hole 44. If the harness accommodating portion 5 of the trim core 6a is insufficiently secured to the door inner panel (not shown), the door inner panel is provided with the locking pin (not shown) 20 to compensate for the insufficiency.

The harness protector 1 is engaged with the guide section 2, the clamp 25 of the wire harness 3 is secured to the harness securing portion 24, the straight segment 34 of the wire harness 3 and the bending starting side 4a of the loop segment 4 thereof are held by the harness securing pieces $28_1$ and $28_2$, the loop segment 4 is accommodated in the harness accommodating section 5, and the cover 19 is mounted over the harness accommodating portion 5 or the door trim 6 is assembled with the door inner panel (not shown). Thus, the arrangement of the wire harness 3 in a motor vehicle is completed.

When the door is closed, the harness protector 1 slides backwards in the guide section 2, the loop segment 4 of the wire harness 3 expands greatly within the harness accommodating section S so that it is located near the tips 32b of the harness sliding protrusive strips $32_1$–$32_3$. The loop segment 4, when its diameter is increased, slides orthogonally to the harness slide protrusive strips $32_1$–$32_3$ while it is in contact with them with linear contact and low friction. This prevents sliding sound from occurring and permits the diameter to be smoothly increased.

When the door is opened, the harness protector 1 (FIG. 1) is pulled out forward along the guide section 2. Correspondingly, the loop segment 4 of the wire harness 3 is pulled to decrease its diameter. The loop segment 4, when its diameter is decreased, is in contact with the harness sliding protrusive strips $32_1$–$32_3$ with linear contact and low friction. This prevents sliding sound from occurring and permits the diameter to be smoothly decreased. The loop segment 4 with the diameter reduced is located around the harness supporting pin 46. The tape-wound portion of the wire harness 3 keeps the shape of the straight segment 34 and the curve starting side 4a of the loop segment 4 to prevent the warp or displacement at the other portion than the expandable/contractable portion 4b when the door is opened or closed. When the door is opened or closed, the portion 4b of the loop segment 4, unwound by the tape, expands/contracts smoothly so that it does not affect the operation of opening/closing the door.

In the embodiment described above, the guide section 2 and harness accommodation portion 5 are formed integrally to the door trim 6. However, these portions may be formed integrally to the door inner panel of synthetic resin (reference numeral 51 in FIG. 6 showing the prior art) in place of the door trim 6. In this case, the door trim 6 (trim core 6a) can be used in place of the cover 19.

What is claimed is:

1. An arrangement structure for a door harness for a vehicle, comprising:
    a wire harness which can be curved to form a loop segment;
    a harness protector in which the wire harness is held;
    a guide section in which the harness protector is slidably engaged;
    a harness accommodating section in which the loop segment of the wire harness is accommodated; and
    a door structure integrated to said guide section and said harness accommodating section,
    said guide section having a pair of guide components each having a horizontal wall extending from said door structure and a vertical wall inwardly protruding from the horizontal wall to form an L-shape in cross-section, and said harness protector having a pair of plate-like sliding portions which are in slidable engagement with said guide components.

2. An arrangement structure of a door harness according to claim 1, wherein said harness accommodating section has a harness accommodation wall which is successive to said guide section and extending integrally from said door structure.

3. An arrangement structure of a door harness according to claim 1, wherein said harness accommodating section has a plurality of harness sliding protrusive strips radially formed to correspond to the loop segment of the wire harness.

4. An arrangement structure of a door harness according to claim 1, wherein said harness accommodating section has a harness fixing piece formed integrally to said door structure.

5. An arrangement structure of a door harness according to claim 4, wherein said harness fixing piece has a harness securing arm to form a gap into which the harness is to be inserted.

6. An arrangement structure of a door harness according to claim 4, wherein said wire harness includes a straight segment on which a tape is wound, said loop segment is composed of a fixed portion on which the tape is wound and secured to said harness fixing piece and an expandable/contractable portion successive to said harness protector.

7. An arrangement structure of a door harness according to claim 1, wherein said harness accommodating section has a harness supporting pin which is formed integrally to said door structure so that it is located inside said loop segment.

8. An arrangement structure of a door harness according to claim 1, wherein said harness accommodating section has a cover securing piece formed integrally to said door structure and to be engaged with a cover.

9. An arrangement structure of a door harness according to claim 1, wherein said door structure is made of synthetic resin.

10. An arrangement structure of a door harness according to claim 1, wherein said harness protector is made of a soft material.

* * * * *